United States Patent [19]

Hallanger

[11] 4,136,672
[45] Jan. 30, 1979

[54] FLAT PLATE SOLAR ENERGY COLLECTOR

[76] Inventor: Lawrence W. Hallanger, 1410 Ambrose, Oxnard, Calif. 93030

[21] Appl. No.: 780,899

[22] Filed: Mar. 24, 1977

[51] Int. Cl.² .............................................. F24J 3/02
[52] U.S. Cl. .................................... 126/271; 237/1 A
[58] Field of Search ................ 126/270, 271; 237/1 A

[56] References Cited

U.S. PATENT DOCUMENTS

| 3,254,703 | 6/1966 | Thomason | 126/271 |
| 3,369,539 | 2/1968 | Thomason | 126/271 |
| 3,387,602 | 6/1968 | Thomason | 126/271 |
| 3,991,742 | 11/1976 | Gerber | 126/271 |
| 4,030,477 | 6/1977 | Smith | 126/271 |
| 4,067,319 | 1/1978 | Wasserman | 126/271 |

Primary Examiner—Kenneth W. Sprague
Attorney, Agent, or Firm—Richard S. Sciascia; Joseph M. St.Amand

[57] ABSTRACT

Apparatus for collecting solar radiation in the form of heat and transferring it to a working fluid, including in combination, a collector surface and a highly porous open cell material used as a fluid carrier which abuts and allows the working fluid to contact the back side of the collector surface.

10 Claims, 2 Drawing Figures

FLAT PLATE SOLAR ENERGY COLLECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to an improved solar heater, and particularly to a simple, low cost flat plate type solar energy collector suitable for, among other things, heating water for residential use.

A variety of solar energy collectors have been developed. Some types require the working fluid to flow over the outer surface of a heat absorbing material; others require the use of ducts and metal collector plates; still others are based on heat pipe technology requiring numerous heating tubes containing the working fluid. Frequently the working fluids are "exotic" types and do not include water.

The present invention overcomes disadvantages of prior type devices by using an open cell material as the working fluid carrier, which is in contact with the collector surface.

SUMMARY OF THE INVENTION

A device for collecting solar radiation in the form of heat and transferring it to a working fluid utilizing a flat plate collector in an insulated outer housing having a transparent wall for admission of solar energy; the flat plate collector comprises a relatively thin layer of highly porous open cell fluid carrier material enclosed in a waterproof covering such as black polyethylene; fluid flow lines on opposite edges of the collector plate supply fluid flow through the open cell layer; the waterproof covering on the side facing the transparent housing wall acts as the collector surface; working fluid passing through the thin porous plate, across the interior of the collector plate, contacts the interior of the collector surface where heat from solar energy is transferred from the collector surface directly to the working fluid.

It is an object of the invention, therefore, to provide a solar energy heating device that can be used in or on a roofs or walls of buildings or structures, as an addition to or portion thereof, for heating or supplemental heating of the structure itself or for other heating puposes.

It is also an object to provide a convenient, inexpensive solar energy heating device for heating water and other working fluids.

DETAILED DESCRIPTION OF THE PREFERRED EMBODIMENT

Figure 1:
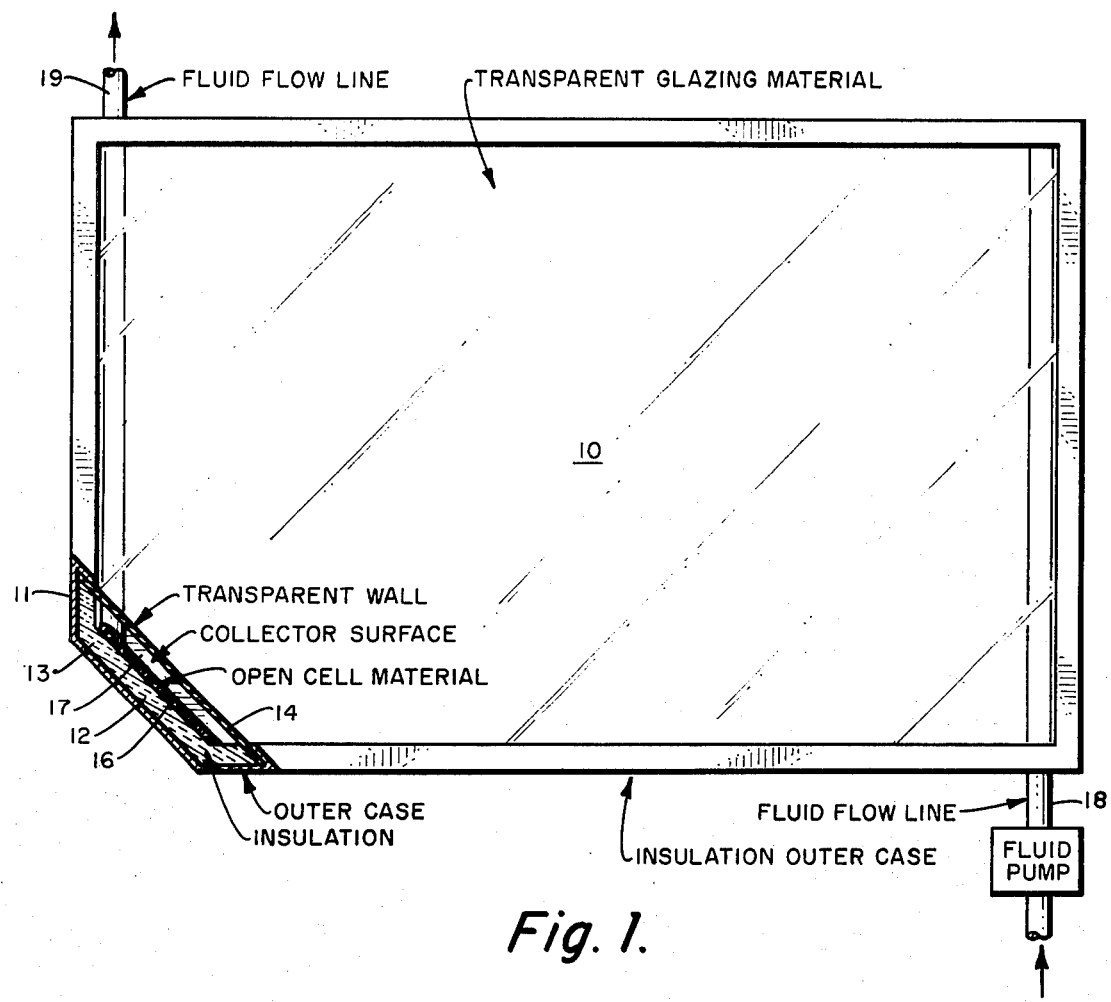
FIG. 1 is a top view of one embodiment of a flat plate solar energy collector of the present invention, showing a corner cut-away.
Figure 2:
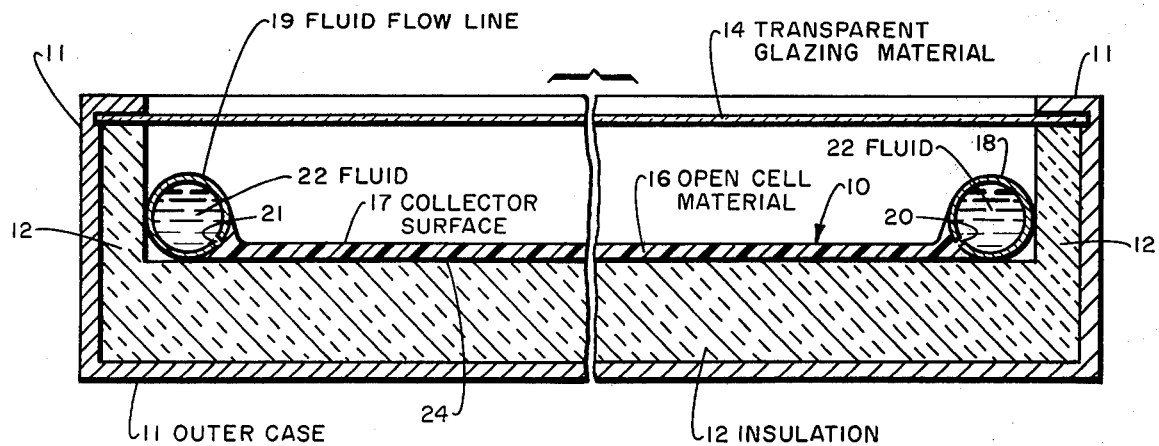
FIG. 2 is an enclosed cross-sectional view across the device shown in FIG. 1.

The solar energy device of the present invention operates to collect heat energy from solar radiation and transfer such heat directly to a working fluid, such as water. The device as shown in FIGS. 1 and 2 utilizes a flat plate collector 10 within a housing consisting of an outer case 11 and insulated inner walls 12 and 13, for example. The housing has a roof or at least one wall 14 of material transparent to solar radiation in order to admit solar radiation to the collector plate. Within the housing flat plate collector 10 rests within and against insulated walls 12 and 13 and is preferably spaced apart from transparent wall 14. The housing may be mounted on a building or structure such that the transparent wall faces the sun for the better part of the day or, if desired, mounted on a movable structure that can be moved to directly face the sun as the earth moves.

Collector plate 10 consists of a relatively thin layer of highly porous open cell material 16, similar to open cell low density foamed plastic materials (such materials have been used in air filter applications, for example, as air filters on small lawn mower-type gasoline engines, and for packing materials), which is not affected by water or other working fluids. The porous layer 16 is entirely enclosed in a waterproof covering 17. Black polyethylene material is an ideal type of material for the waterproof covering 17 since it acts as a good collector surface on the side of layer 16 which faces the transparent wall. Waterproof covering 17 is preferably bonded to porous layer 16. Fluid flow lines 18 and 19 are mounted on two opposite edges of porous layer 16, as shown in FIGS. 1 and 2. Line 18 for fluid flow in and line 19 for fluid flow out, for example. Flow lines 18 and 19 have a plurality of perforations or passageways 20 and 21, respectively, along the lengths thereof to permit the working fluid 22 to flow from line 18 through plural passageways 20 into and across the thin layer of porous open cell material 16 to plural passageways 21 and out through fluid flow line 19. The open cell material of layer 16 is an excellent fluid carrier and acts as a path for the working fluid to flow from one fluid flow line to the other. The thickness of porous layer 16 depends upon the sizes of the cells, the cross-sectional flow path area, and the desired rate of flow of the working fluid.

In addition to open cell low density foam plastic materials for use as the porous layer, uncoated coarse fiberglass having a high proportion of space between fibers can be used. Such material also reduces thermal convection.

A pump 23, as shown in FIG. 1, can be used to cause the working fluid to flow through the system, or if fluid flow line 18 edge of the collector is elevated above fluid flow line 19 edge of the collector, the working fluid can flow by gravitational force from line 18 through porous layer 16 to line 19.

The housing walls insulation 12 and 13 can be foamed plastic or fiberglass insulations, for example. A reflective material layer can be used at 24, if desired, between insulation 13 and collector plate 10. The working fluid 22, as it passes through layer 16, comes in close contact with broad collector surface 17 facing transparent wall 14. Waterproof covering 17 acts as a heat energy collector from the solar energy passing through transparent wall 14 and impinging on its surface; as working fluid 22 flows across porous layer 16 in contact with the interior surface of waterproof covering 17, solar energy in the form of heat is transferred from surface 17 directly to the working fluid where it then passes on to flow line 19 and directed on to storage or to its point of use.

The present solar energy device can be used to directly heat various fluids; water, in particular, can be used as a fluid to transfer heat directly from the collector to the point of use or to storage for later use or various applications.

The collector can be mounted flat, vertical or at an angle, as desired, on a roof or wall for exposure to solar radiation. The collector can also be used on a mount which moves to track the sun for maximum exposure to solar radiation or no exposure, as desired.

Obviously many modifications and variations of the present invention are possible in light of the above teachings. It is therefore to be understood that within the scope of the appended claims the invention may be practiced otherwise than as specifically described.

I claim:

1. A solar energy heat collector comprising:
   a. an insulated outer housing;
   b. said housing having at least one broad surface, non-insulated wall which is transparent to solar radiation;
   c. a flat plate collector within said housing spaced apart from and facing said transparent wall;
   d. said flat plate collector consisting of a relatively thin layer of highly porous open cell material encased in a waterproof covering, at least the portion of said waterproof covering which faces said transparent wall being non-transparent and in close contact with said layer of porous open cell material, and operating to absorb and collect solar energy; said porous material also operating to reduce thermal convection;
   e. first and second fluid flow means connected along first and second opposite edges, respectively, of said porous open cell layer, and a working fluid operable to flow from said first fluid flow means into, through and across said porous open cell layer to said second fluid flow means while circulating against the inner surface of said non-transparent waterproof covering;
   f. the solar energy impinging upon said non-transparent waterproof covering being transferred as heat energy from said non-transparent waterproof collector surface directly to said working fluid as said working fluid passes through said porous layer in intimate contact with the inner surface of said non-transparent energy collecting covering; said heated working fluid also being operable to be directed from said second fluid flow means to a point where it is to be used.

2. A solar energy collector system as in claim 1 wherein said layer of highly porous open cell material is of low density foamed plastic.

3. A solar energy collector system as in claim 1 wherein said porous layer is of uncoated fiberglass fibers having a high proportion of space between fibers, and which operates to reduce thermal convection.

4. A solar energy collector system as in claim 1 wherein a pump means is provided for forcing said working fluid to flow through the system.

5. A solar energy collector system as in claim 1 wherein said waterproof non-transparent covering is bonded to said porous layer.

6. A solar energy collector system as in claim 1 wherein said waterproof non-transparent covering is black polyethylene.

7. A solar energy collector system as in claim 1 wherein a reflective layer is provided between said flat plate collector and the insulated walls of said housing.

8. A solar energy collector system as in claim 1 wherein said first and second fluid flow means consist of first and second fluid distribution flow lines and wherein a plurality of passageways are provided along said first and second fluid flow lines between said fluid flow lines and the first and second opposite edges of said porous layer to provide fluid ingress and egress, respectively, along the entire said opposite edges of said porous layer.

9. A solar energy collector system as in claim 1 wherein said porous layer provides a large plurality of interconnected passageways for said working fluid to flow across said porous layer in intimate contact with said non-transparent collector surface which faces said transparent wall for rapid transfer of solar heat energy from said collector surface directly to said working fluid.

10. A solar energy collector system as in claim 1 wherein said working fluid is water.

* * * * *